(12) United States Patent
Bose et al.

(10) Patent No.: US 9,087,088 B1
(45) Date of Patent: Jul. 21, 2015

(54) SYSTEMS AND METHODS FOR DYNAMIC CONSTRUCTION OF ENTITY GRAPHS (71) Applicant: American Express Travel Related Services Company, Inc., New York, NY (US)

(72) Inventors: Abhijit Bose, Paramus, NJ (US); Winnie Cheng, Jersey City, NJ (US); Anthony Mavromatis, Brooklyn, NY (US); Huiming Qu, Scarsdale, NY (US); Benjamin Schulte, Brooklyn, NY (US); Kendell Timmers, Jersey City, NJ (US); Venkat Varadachary, New York, NY (US); Wei Yin, Jersey City, NJ (US); Hao Zhou, Jersey City, NJ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 45 days.

(21) Appl. No.: 13/675,651

(22) Filed: Nov. 13, 2012

(51) Int. Cl.
*G06F 17/30* (2006.01)

(52) U.S. Cl.
CPC ............................... *G06F 17/30312* (2013.01)

(58) Field of Classification Search
USPC .......... 707/737, 741, 769, E17.011, E17.014, 707/E17.046, E17.082, E17.119, 723, 727, 707/732, 756, 759; 705/26.7, 14.49, 14.53, 705/14.66, 27.1, 330
See application file for complete search history.

(56) References Cited

U.S. PATENT DOCUMENTS

| | | | | |
|---|---|---|---|---|
| 8,145,679 | B1* | 3/2012 | Baluja et al. | 707/802 |
| 2009/0248434 | A1* | 10/2009 | Pfeffer et al. | 705/1 |
| 2011/0142217 | A1* | 6/2011 | Goldfarb | 379/126 |
| 2011/0252032 | A1* | 10/2011 | Fitzgerald et al. | 707/737 |
| 2012/0130724 | A1* | 5/2012 | Flegel et al. | 705/1.1 |
| 2012/0324027 | A1* | 12/2012 | Vaynblat et al. | 709/206 |
| 2013/0124357 | A1* | 5/2013 | He et al. | 705/26.3 |
| 2014/0122595 | A1* | 5/2014 | Murdoch et al. | 709/204 |

* cited by examiner

*Primary Examiner* — Jay Morrison
*Assistant Examiner* — Ken Hoang
(74) *Attorney, Agent, or Firm* — Snell & Wilmer L.L.P.

(57) ABSTRACT

The present disclosure includes a system, method, and article of manufacture for generating an entity graph. The method may comprise determining a relationship between a first entity and a second entity based upon internal data, external data, and/or online data associated with the first entity, and generating the entity graph comprising at least two nodes and an edge connecting the at least two nodes. The method may further comprise, in various embodiments, tailoring marketing to the first entity based upon the entity graph, detecting fraud against the first entity based upon the entity graph, periodically updating the entity graph based upon new internal data and new online data, and/or adjusting the edge based upon a change in the relationship between the first entity and the second entity.

18 Claims, 4 Drawing Sheets

SYSTEMS AND METHODS FOR DYNAMIC CONSTRUCTION OF ENTITY GRAPHS

BACKGROUND

1. Field

The present disclosure generally relates to constructing relationships between one or more entities, and more particularly, to constructing a graph based on those relationships.

2. Related Art

With the proliferation of the Internet, as well as the growing popularity of mobile communication devices, marketplaces in which deals (e.g., offers, recommendations, etc.) are exchanged (e.g., purchased, sold, traded, distributed, etc.) have grown over time. This "deals marketplace" has grown quickly, but has encountered a number of challenges. For example, deals are often poorly tailored to consumers (e.g., deals are irrelevant or less relevant to consumers), which may lead many consumers to opt out of receiving such deals and/or a tendency of consumers to "tune out" or ignore deals that are received. It would therefore be advantageous to have a system in which one or more merchants are able to accurately tailor relevant deals to one or more consumers.

SUMMARY

The present disclosure includes a system, method, and article of manufacture for generating an entity graph. The method may comprise determining a relationship between a first entity and a second entity based upon internal data, external third party data, and/or online data associated with the first entity, and generating the entity graph comprising at least two nodes and an edge connecting the at least two nodes. The method may further comprise, in various embodiments, tailoring marketing to the first entity based upon the entity graph, detecting fraud against the first entity based upon the entity graph, managing risk based upon the entity graph, recommending products, services, actions, entities, items, and the like based upon the entity graph, periodically updating the entity graph based upon new internal data, external third party data, and/or new online data, and/or adjusting the edge based upon a change in the relationship between the first entity and the second entity. Further still, in various embodiments, the method may comprise generating another entity graph between a third entity and a fourth entity, and combining the another entity graph with the entity graph to create a universal entity graph. Moreover, a node may correspond to an entity, while an edge may correspond to a relationship between entities. In various embodiments, an edge may be associated with zero or any number of attributes describing relationships between entities.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The phrases consumer, customer, user, account holder, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, an transaction account user, an account affiliate, a child account user, a subsidiary account user, a beneficiary of an account, a custodian of an account, and/or any other person or entity affiliated or associated with a transaction account. In addition, as used herein, a user may comprise, in various embodiments, any person who interacts and/or interfaces with a computer system (e.g., an organizational and/or an employer computer system).

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

As used herein, phrases and terms similar to an "entity" may include anything with which a consumer may be associated. For instance, an entity may include any individual, consumer, customer, card member, group, business, merchant, place, brand, cuisine, interest, preference, influence or influencer, celebrity, organization, government entity, transaction account issuer or processor (e.g., credit, charge, etc.), consortium of merchants, account holder, charitable organization, software, hardware, and/or any other type of entity. The terms "user," "consumer," "purchaser," "cardmember," and/or the plural form of these terms are used interchangeably throughout herein to refer to those persons or entities that are alleged to be authorized to use a transaction account.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filling station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

A system, method and/or computer program product for constructing an entity graph is disclosed. In various embodiments, an entity graph may comprise a graphical representation of one or more relationships between one or more entities. Thus, for example, an entity graph may illustrate a relationship between one or more customers, one or more merchants, one or more locations, and the like.

Figure 1:
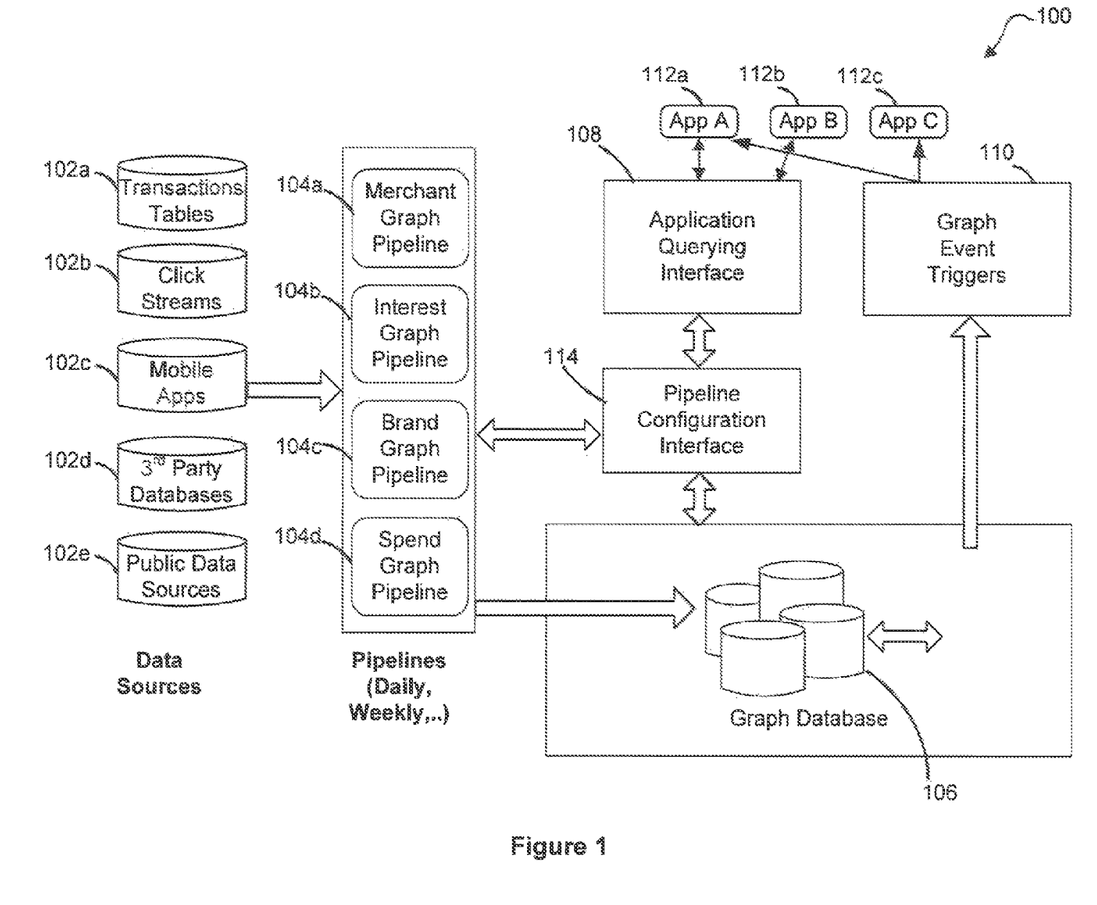
FIG. 1 shows an exemplary system diagram, in accordance with various embodiments.

With particular reference to FIG. 1, system 100 may comprise one or more data sources such as, for example, 102*a*-102*e*, one or more graphing pipelines, modules, engines, or systems such as, for example, 104*a*-104*d*, one or more graph databases 106, one or more application querying interfaces or modules 108, one or more graph event trigger modules 110, one or more applications or application modules such as, for example, 112*a*-112*c*, and/or one or more pipeline configuration interface modules 114.

A data source 102*a*-102*e* may comprise any source of data useful for generating an entity graph. More particularly, in various embodiments, a data source 102*a*-102*e* may comprise any online data, any offline data, and/or any internal data. For instance, in various embodiments, a data source 102*a*-102*e* may comprise a transaction table 102*a*, a click stream 102*b*, a mobile application 102*c*, a third party database 102*d*, a public data store 102*e*, and/or the like.

A graphing pipeline or graphing pipeline module (e.g., each pipeline 104*a*-104*d*) may comprise any computer system capable of determining a relationship between entities and/or generating an entity graph. A graphing pipeline 104*a*-104*d* may develop a time series of entity graph snapshots, as described herein, that show or illustrate trending over time. For instance, as described herein, a pipeline may periodically update an entity graph. Thus, a series of entity graphs may be compiled over time to develop a trending analysis. Further, in various embodiments, given one or more entities, observations associated with the entities, timestamps associated with the entities, and the like, a graphing pipeline 104*a*-104*d* may determine whether an edge connecting entities exists. If an edge exists, the pipeline may update or adjust the edge. Similarly, if the edge does not exist, the pipeline may create a new edge connecting entities. Further, in either case, the pipeline may calculate or determine one or more attributes associated with the edge, as described herein. Values associated with an edge may also be calculated, in various embodiments, in response to the evaluation and/or determination of multiple entities and the relationships or edges between those entities. Such calculations or determinations may result in derived entities such as, for example, marketing segments related to entities.

In various embodiments, a graphing pipeline 104*a*-104*d* may comprise a merchant graph pipeline 104*a*, an interest graph pipeline 104*b*, a brand graph pipeline 104*c*, a spend graph pipeline 104*d*, and the like. In various embodiments, a merchant graph pipeline 104*a* may generate an entity graph associated with one or more merchants (e.g., a graph detailing a relationship between one or more merchants and one or more other entities). Likewise, an interest graph pipeline 104*b* may generate an entity graph associated with one or more interests (e.g., a graph detailing a relationship between one or more interests, such as golf or Italian food, and one or more other entities). For example, in various embodiments, an interest graph pipeline 104*b* may comprise an interest graphing system as described in U.S. Provisional Patent Application No. 61/700,850, filed Sep. 13, 2012 and entitled SYSTEMS AND METHODS FOR AN ANALYSIS CYCLE TO DETERMINE INTEREST MERCHANTS, which is hereby incorporated by reference in its entirety. Further, in various embodiments, a brand graph pipeline 104*c* may generate an entity graph associated with one or more brands (e.g., a graph detailing a relationship between one or more brands and one or more other entities). Further still, in various embodiments, a spend graph pipeline may generate an entity graph associated with a spend or transaction history (e.g., a graph detailing a relationship between a consumer's spend history and one or more other entities). In various embodiments, a variety of other pipelines may be implemented as well.

A graph database 106 (or graph database module) may comprise any type of hardware and/or software (e.g., a computer server) configured or configurable to store data and/or host a database. For example, a graph database 106 may comprise a server appliance running a suitable server operating system (e.g., IIS, HADOOP, LINUX, etc.) and having database software (e.g., SQL Server 2008, an Oracle database, one or more distributed and/or graph databases, such as HBASE, JIRAFE, and the like), stored thereon. A graph database 106 may, in various embodiments, be coupled to and/or interact with a pipeline 104*a*-104*d*, an application querying interface 108, and/or a graph event trigger module 110 as described herein. Further, in various embodiments, a graph database 106 may store one or more entity graphs. Further still, in various embodiments, a graph database 106 may include various performance optimizing components and/or subcomponents, such as, for example, one or more streaming engines, one or more real time or substantially real time caches, one or more scheduling capabilities, and the like. Moreover, in various embodiments, a graph database 106 may comprise a relationship application, module, or engine, as described herein. A graph database 106 may also comprise a streaming component or module that interfaces with a pipeline 104a-104d to receive and/or pull data into the graph database 106. In addition, a graph database may comprise, in various embodiments, a real time or substantially real time cache component or module that allows fast responses to communications from an application querying interface module 108. A graph database 106 may also comprise an interface or interface module configured to communicate with an event trigger module 110, as described herein, to detect new edges, changes to edges, updates to edges, edge trends, and the like.

An application querying interface module 108 may comprise any hardware, software, and/or system capable of communicating with and/or querying a graph database 106 and/or an application module 112a-112c. In various embodiments, an application querying interface module 108 may include any ability or functionality to read, write, and/or query data and/or any ability or functionality to update data and/or insert new data.

A graph event trigger module 110 may comprise any hardware, software, and/or system capable of communicating with and/or querying an application 112a-112c and/or a graph database 106. In various embodiments, a graph event trigger module may comprise an instruction, circumstance, or set of circumstances which alert application modules that have registered on these events and/or may trigger the generation or updating of an entity graph and/or cause an entity graph to be generated and/or updated. Moreover, in various embodiments, a graph event trigger module 110 may determine or detect a change to an entity graph, such as, for example, a change to an entity, an edge, a trend that is emerging or exists in the graph, and the like. Thus, in various embodiments, a graph event trigger module 110 may alert one or more application modules (e.g., 112a-112c) of a change or changes to an entity graph, which may allow an application module to take any suitable action. For example, where a graph event trigger module 110 detects a new edge forming between a first city (e.g., New York) and a second city (e.g., London), as described herein, a travel recommendation application module may be alerted by the trigger. The application module may, in response, propose, suggest, or tailor one or more items (e.g., merchants, restaurants, sightseeing tours, etc.) to a consumer entity, for example, based upon the new edge in London and/or New York.

An application 112a-112c module or engine (e.g., a relationship application module or engine or simply, a relationship engine) may comprise any hardware, software, and/or system capable of generating or determining a relationship between entities and/or making a recommendation (e.g., of an item or entity) based upon an entity graph. Similarly, in various embodiments, an application module or engine 112a-112c may comprise a marketing campaign, a fraud detection modeling application, and the like. Thus, an application module or engine 112a-112c may determine relationships between entities, and these relationships may, as described herein, contribute to one or more entity graphs. Further, in various embodiments, an application module may tailor or recommend one or more items or entities to another entity.

A pipeline configuration interface module 114 may comprise any hardware, software, and/or system capable of communicating with an application querying interface module 108 and/or a pipeline 104a-104d. In various embodiments, a pipeline querying interface module 114 may provide a user interface where parameters controlling how one or more pipelines 104a-104d function may be adjusted, either manually or automatically.

Figure 2:
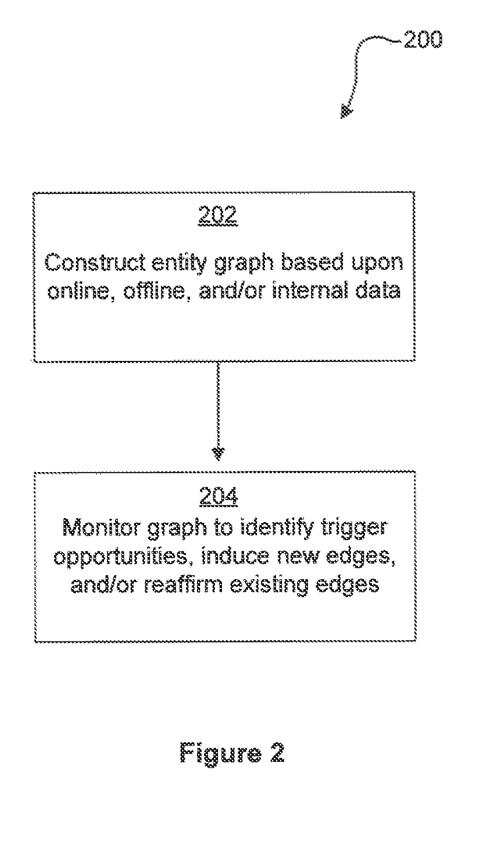
FIG. 2 shows a flowchart depicting an exemplary process for constructing an entity graph, in accordance with various embodiments.
Figure 3:
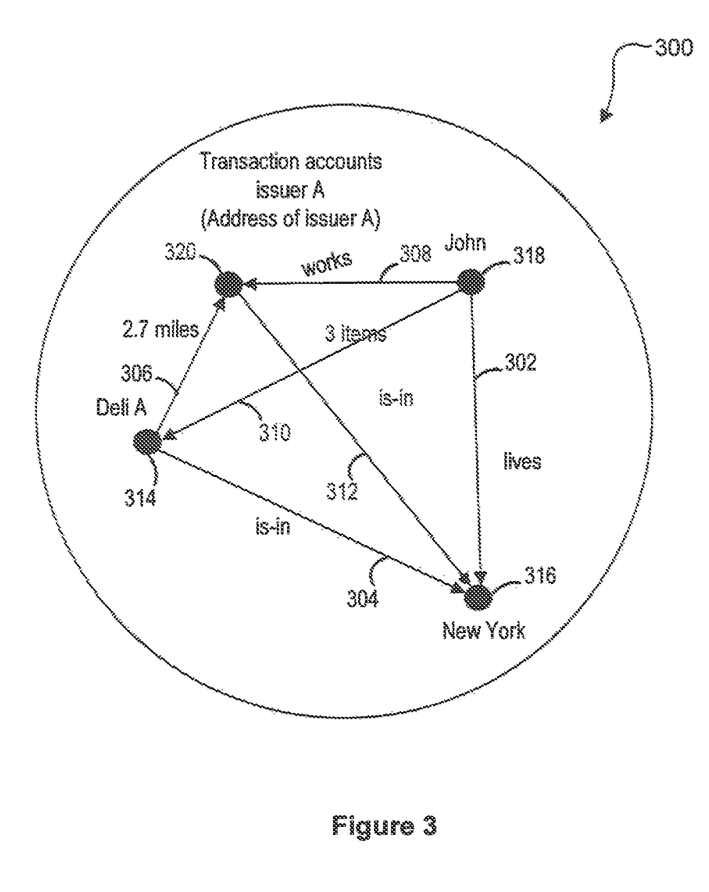
FIG. 3 shows an exemplary entity graph, in accordance with various embodiments.
Figure 4:
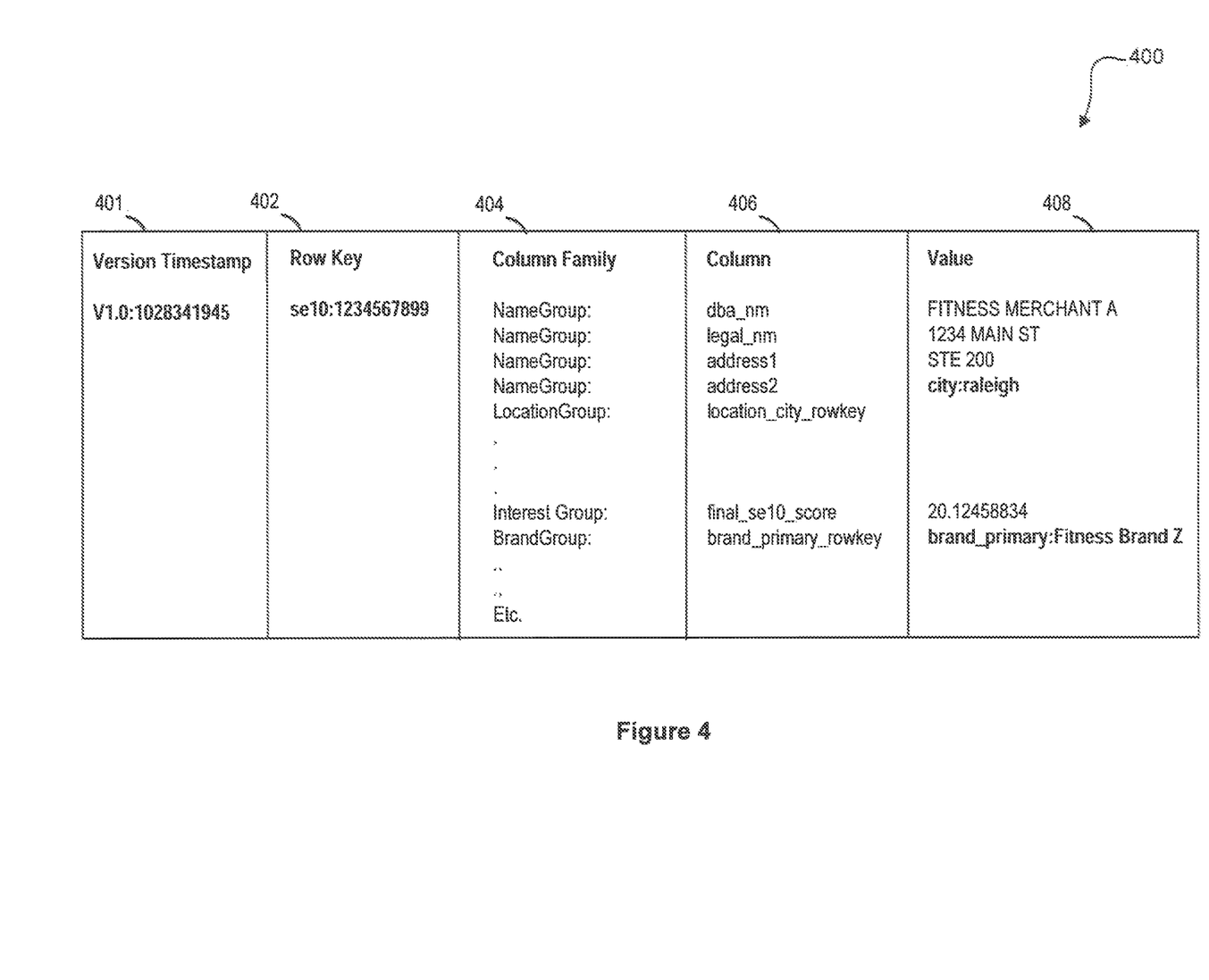
FIG. 4 shows an exemplary entity graph database structure, in accordance with various embodiments.

Referring broadly now to FIGS. 2-4, the process flows, logical representations, and/or screen shots depicted are merely embodiments and are not intended to limit the scope of the disclosure. For example, the steps recited in any of the method or process descriptions may be executed in any order and may, in various embodiments, apply to the system 100 depicted in FIG. 1. It will be appreciated that the following description makes appropriate references not only to the steps depicted in FIGS. 2-4 but also to the various system components and/or logical representations as described above with reference to FIG. 1.

With reference now to FIG. 2, an exemplary process 200 for generating an entity graph is disclosed. As shown, an entity graph may be constructed based upon online, offline, third party, and/or internal data (step 202). For example, in various embodiments, an entity graph may be based upon a consumer's offline spend data or transaction history and/or a consumer's online behavioral and/or transaction data. Thus, an entity graph may be based upon a large variety of data, and these data may be used to generate a robust and detailed entity graph.

Accordingly, in various embodiments, and with reference to FIG. 3, an entity graph 300 may comprise one or more edges 302-312 and/or one or more nodes 314-320. A node may comprise an entity, as described herein, and an edge may comprise a relationship between two nodes. In various embodiments, an edge may have zero or more attributes.

Thus, for example, a node 314 may represent a merchant, such as the merchant "Deli A." Similarly, a node 316 may represent a city, such as New York, while a node 318 may represent a consumer, e.g., "John," and a node 320 may represent a location or address associated with a transaction account issuer.

Each edge comprising an entity graph may represent a relationship between two nodes, and, in various embodiments, a node and/or an edge may be associated with a variety of attributes and/or a vector of attributes, such as, for example, a distance, a number of entities connected to a node, a type of edge, a group of entities coupled to an edge or coupled to another entity or group of entities, a network analysis result or results based upon one or more entity relationships, and the like. Thus, for example, in various embodiments, an edge may have a length attribute comprising a length of the edge (and/or a distance between two nodes), and the length may represent a correlation between two nodes. More particularly, a smaller distance between nodes may represent a stronger correlation or relationship between the nodes, and a larger distance between nodes may represent a weaker correlation or relationship between the nodes.

For instance, with respect to the entity graph 300, an edge 302 may represent a relationship between the node 318 (representing, in this example, the consumer John) and the node 316 (representing, in this example, the city of New York). Further, in various embodiments, the proximity of a node associated with an entity such as a consumer, business, or merchant to a node associated with city may indicate that the entity associated with node (e.g., the node 318) is also associated with the city (e.g., the node 316), and/or an inference may be drawn by system 100 that a consumer lives in a particular city or a business is in a particular city based upon a proximity of the node associated with the city to the node associated with the business or consumer. In addition, an edge, such as the edge 306, may be associated with a value such as a distance, and this distance may represent a physical distance between a location associated with the entity represented by a first node and an entity represented by a second node. Thus, an edge such as, for example, edge 306 may be associated with a value of 2.7 miles, and this distance may be the distance between the entity associated with the node 320 (transaction account issuer A) and the entity associated with node 314 (Deli A).

Likewise, with reference to edge 310, this edge may be associated with a value, such as a number of transaction or records of charge (ROCs) between the consumer associated with node 318 and the restaurant associated with the node 314 (Deli A). Further, as a number of ROCs between the consumer associated with node 318 and the restaurant associated with the node 314 increases, the distance between these nodes 314 and 318 may be reduced so that the nodes may be drawn or graphed more closely together, and this may indicate that a relationship between the consumer associated with node 318 and the restaurant associated with the node 314 is strengthening.

An edge may be determined or generated, as described herein and in various embodiments, based upon any process or algorithm for determining a relationship between two entities or nodes. Thus, for example, an edge such as the edge 312 may be based simply upon an association between a node, like node 320 which represents an entity, and a node, like node 316, that represents a city, and this association may be formed based upon information indicating that the entity associated with the node 320 lives, has lived, is located, and/or has been located in the city associated with the node 316.

Further, in various embodiments and as described herein, an edge may be generated based upon a collaborative filtering algorithm, a fraud detection model or algorithm, a marketing campaign algorithm, one or more network models, any time series trend analysis, any machine learning algorithm or algorithms, and the like. For instance, in various embodiments, a process for generating an edge or entity graph and/or tailoring marketing may comprise a collaborative filtering process as described in U.S. patent application Ser. No. 11/315,262, filed, Dec. 23, 2005, and entitled Method and Apparatus for Collaborative Filtering of Card Member Transactions, which is incorporated herein by reference in its entirety. In addition, in various embodiments a process for generating an edge or entity graph and/or tailoring marketing to a consumer may be implemented as described in U.S. patent application Ser. No. 11/500,492, filed, Aug. 8, 2006, and entitled System and Method for Predicting Card Member Spending Using Collaborative Filtering, which is incorporated herein by reference in its entirety.

Accordingly, with returning reference to FIG. 1, one or more graphing pipelines 104a-104d may be run to capture data from one or more particular sources (e.g., internal data, online consumer data such as search history data, online spend data, browsing data, and the like). These pipelines may further, as described herein, be run to generate one or more entity graphs according to one or more processes or algorithms. Further, in various embodiments, each pipeline 104a-104d may generate a specific entity graph to graph certain types of relationships, and these entity graphs may be referred to as "entity subgraphs." For example, the merchant graph pipeline 104a may generate an entity subgraph that shows a relationship between one or more merchants and/or one or more other entities, while an interest graph pipeline 104b may generate a subgraph showing relationships between consumers and one or more interests (e.g., dining interests, recreational interests, travel interests). Similarly, a brand graph pipeline 104c may generate a subgraph showing relationships between one or more brands and one or more other entities (e.g., between Brand A and consumer B), while a spend graph pipeline 104d may generate a subgraph showing relationships between one or more entities and the spending associated with those entities (e.g., between a consumer A and the consumer A's spending in terms of a number of ROCs with a merchant entity).

A plurality of entity subgraphs may, in various embodiments, be combined by the system 100 (e.g., by the graph database 106) to form a "universal entity graph," which may show the relationships between entities generated by all or a portion of the entity graph pipelines 104a-104d (and/or other pipelines). Each pipeline 104a-104d may further update and/or regenerate one or more existing entity subgraphs based upon additional or newly acquired entity data. For example, as a consumer's transaction history develops and changes, an entity graph pipeline may update, create, and/or recreate an entity subgraph based upon this new data. Entity subgraphs may be updated and/or generated on a on a periodic basis and/or in response to the receipt or accessibility, by the system 100, of new or updated data. Thus, entity subgraphs may adapt and evolve as relationships between entities develop and change. For instance, edges and nodes may be created, deleted, and/or altered over time.

With reference to FIG. 4, an exemplary entity graph or subgraph database structure 400 is shown. An entity graph database structure 400 may, in various embodiments, comprise a relational database structure. Thus, as shown, an entity graph database structure 400 may comprise a version timestamp 401, row key 402, a column family 404, a column 406, a value 408, and the like. A version timestamp 401 may, in various embodiments, allow or enable the comparison of different versions of data within a graph database structure 400 to perform trending analysis and/or other time based data analysis, graphing, and/or exploration. A row key 402 may comprise an identifier (e.g., a unique identifier) and/or a primary key associated with an entity. For instance, in various embodiments, a row key 402 may comprise a primary key associated with a merchant or service establishment (e.g., as shown at FIG. 4, the row key 402 associated with the merchant se10 is 1234567899).

Further, a column family 404 may include data associated with a particular entity (e.g., the merchant se10). Data under the column family 404 column may include data about the entity and/or, in various embodiments, data about which entities or nodes a particular entity is associated with or related to. Thus, where the entity se10 is related to a brand or a location, this information may be included in column 404. Further, under this column 404, the entities or nodes with which the entity identified by the primary row key 402 may be summarized at a group level. For instance, column 404 may identify a consumer associated with a deli (e.g., Deli A) as a consumer associated with an interest group such as delicatessens, sandwiches, dining out, and the like.

A column 406 may, like the data identified under column family 404, include data associated with the particular entity and/or the relationships between that entity and other entities. However, the data under column 406 may be more granular or specific than the data under column 404. Thus, for example, the data under column 406 may include one or more specific relationships between the particular entity identified by the row key 402 and other entities. For instance, as shown, a specific name, address, city location primary key, brand primary row key, and the like may be included under column 406.

Under the value column 408, information specifying an entity's particular information may be stored. For example, column 408 may include an entity's specific name (e.g., Fitness Merchant A), an entity's specific address, the specific entities that the entity is related to (e.g., Fitness Brand Z), and the like.

In various embodiments, and with returning attention to FIG. 2, the system 100 may, through an entity graph, identify one or more trigger opportunities (step 204). Further, in various embodiments, the system 100 may identify a change or alteration in a graph or graph structure and/or a changing trend between, for example, multiple versions of an entity graph and/or within a single version of an entity graph over time. A trigger opportunity may comprise an opportunity to market or recommend an entity to another entity, an operational risk assessment and/or management opportunity, detection of fraud, and the like. For example, a trigger opportunity may comprise, in various embodiments, an opportunity to market a merchant and/or a merchant's product to a consumer. A trigger opportunity may be identified by the system 100 based upon a change to an entity graph. More particularly, the system 100 may monitor one or more entity graphs (e.g., a universal or combined entity graph, as described herein). Further, in response to detecting a change to the entity graph or entity graphs being monitored (e.g., a change to an edge, a change to a node, and the like), the system 100 may market or recommend an entity to another entity.

To illustrate, the system 100 may induce or create a new edge and/or confirm or adjust an existing edge in response to a purchase by an entity comprising a consumer for a trans-Atlantic flight from New York to London. The edge may associate the consumer with both New York and London, and the distance between the nodes identifying each city may be adjusted such that they are closer together (and thus more strongly interrelated for this consumer) on an entity graph for the consumer. The interest graph for the consumer may, in addition, show an affinity of the consumer for a variety of other entities, and the system 100 may therefore market, tailor, adjust, etc. one or more of these other entities and/or items associated with these entities to the consumer while the consumer is in London. The system 100 may identify these entities based upon a search of an entity graph associated with the city of London for entities that are, based upon the entity graph of the consumer, associated with or related to the consumer.

Further, in various embodiments, system 100 may not search an entity graph. Rather, as described herein, system 100 (e.g., the graph database 106) may detect a new or updated edge. In response to detecting such an edge, system 100 may trigger one or more applications (e.g., 112a-112c), in essence informing each triggered application that the edge exists and/or has changed. The applications may, in turn, utilize or communicate with one or more other aspects or components of system 100 (e.g., any of the pipelines 104a-104d) to retrieve and/or receive one or more relevant entities. Thus, as described herein, where a consumer lives in New York and visits London, the consumer may be associated with an edge between the consumer and the city of New York. In response to the consumer's plans to travel (and/or actual travel) to London (e.g., in response to the purchase of an airline ticket to London), the system 100 may create or update an edge between the consumer and London, and the edge may, in various embodiments, include one or more attributes about the consumer's travel (e.g., travel dates). The graph event trigger module 110 may detect the newly created or updated edge between the consumer and London in the underlying graph database 106 and alert or notify one or more applications 112a-112c of the change. In various embodiments, the applications that are notified or alerted may be registered to receive the notification. For instance, where the notification relates to travel, as described herein, an application registered to receive "travel alerts" may receive such a notification.

In another example, the system 100 may monitor the entity graph associated with a consumer to detect and prevent unauthorized access to the consumer's transaction account information and/or fraud against the consumer. For instance, as the system 100 monitors the consumer's entity graph, the system 100 may detect the creation of a new node which is relatively distant from any other node in the consumer's entity graph (e.g., the system 100 may associate the consumer with a quick service or low cost node, so when a node is created that is associated with a high end or expensive item, the system 100 may alert the consumer to the possibility of fraud).

Thus, the system 100 may utilize a large variety of data associated with an entity, such as a consumer (e.g., internal data, offline data, online data), to build a picture (or entity graph) of the interests and associations of the consumer, and the system 100 may, using this graph and/or the data underlying the graph (e.g., is discussed with reference to FIG. 4), protect and assist the consumer. Consumers are therefore able to receive highly relevant and tailored offers based upon the systems and methods described herein. Moreover, the system 100 may, in addition to a variety of other functionalities, offer consumers greater protection from fraud.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTube, AppleTV, Pandora, xBox, Sony Playstation), a uniform resource locator ("URL"), a document (e.g., a Microsoft Word document, a Microsoft Excel document, an Adobe .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well known manner.

Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer systems may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein.

In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

A firewall may include any hardware and/or software suitably configured to protect CMS components and/or enterprise computing resources from users of other networks. Further, a firewall may be configured to limit or restrict access to various systems and components behind the firewall for web clients connecting through a web server. A firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., Alex Nghiem, IT Web Services: A Roadmap for the Enterprise (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

The terms "payment vehicle," "financial transaction instrument," "transaction instrument" and/or the plural form of these terms may be used interchangeably throughout to refer to a financial instrument.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

What is claimed is:

1. A method comprising:
    determining, by a computer-based system configured for generating an entity graph, a relationship between a first entity and a second entity based upon internal data and online data associated with the first entity and the second entity;
    generating, by the computer-based system, the entity graph comprising at least two nodes and an edge connecting the at least two nodes, in response to the determining and based on attributes associated with the edge,
        wherein the two nodes correspond to the first entity and the second entity, respectively,
        wherein the two nodes include at least one of merchants, interests, brands or spend,
        wherein the edge corresponds to the relationship between the first entity and the second entity, and
        wherein the attributes include at least one of a distance, a number of entities connected to a node, a type of the edge, a group of entities coupled to the edge, a group of entities coupled to another entity, a group of entities coupled to a group of entities, or a network analysis result based upon entity relationships,
    calculating, by the computer-based system, attribute values associated with the edge;
    deriving, by the computer-based system and based on the attribute values, derived entities related to the first entity and the second entity,
        wherein the derived entities are marketing segments related to the first entity and the second entity,
        wherein the marketing segment includes developing a marketing campaign from a marketing campaign algorithm;
    triggering, by the computer-based system, an updating of the entity graph;
    detecting, by the computer-based system, a change to the entity graph based on a trend,
        wherein the trend includes periodic updates to a series of entity graphs over time based on changes in different versions of data within a graph database obtained from version timestamps;
    alerting, by the computer-based system, an application to take an action to adjust for the trend;
    tailoring, by the computer-based system, the two nodes based on the trend;
    recommending, by the computer-based system, the two nodes to other entities; and
    reducing, by the computer-based system, the distance between the two nodes, in response to the strengthening of the relationship between the first entity and the second entity.

2. The method of claim 1, wherein the change to the entity graph includes at least one of new edges, changes to edges, updates to edges, or edge trends.

3. The method of claim 2, further comprising tailoring, by the computer-based system, marketing to the first entity based upon the entity graph.

4. The method of claim 3, further comprising detecting, by the computer-based system, fraud against the first entity based upon the entity graph.

5. The method of claim 4, further comprising periodically updating, by the computer-based system, the entity graph based upon new internal data, new third party data, and new online data.

6. The method of claim 5, further comprising:
    generating, by the computer based system, a second entity graph between a third entity and a fourth entity; and
    combining, by the computer-based system, the second entity graph with the entity graph to create a universal entity graph.

7. The method of claim 6, further comprising adjusting, by the computer-based system, the edge based upon a change in the relationship between the first entity and the second entity.

8. An article of manufacture including a non-transitory, tangible computer readable storage medium having instructions stored thereon that, in response to execution by a computer-based system configured for generating an entity graph, cause the computer-based system to be capable of performing operations comprising:
- determining, by the computer-based system, a relationship between a first entity and a second entity based upon internal data and online data associated with the first entity and the second entity;
- generating, by the computer-based system, the entity graph comprising at least two nodes and an edge connecting the at least two nodes, in response to the determining and based on attributes associated with the edge,
  - wherein the two nodes correspond to the first entity and the second entity, respectively,
  - wherein the two nodes include at least one of merchants, interests, brands or spend,
  - wherein the edge corresponds to the relationship between the first entity and the second entity, and
  - wherein the attributes include at least one of a distance, a number of entities connected to a node, a type of the edge, a group of entities coupled to the edge, a group of entities coupled to another entity, a group of entities coupled to a group of entities, or a network analysis result based upon entity relationships,
- calculating, by the computer-based system, attribute values associated with the edge;
- deriving, by the computer-based system and based on the attribute values, derived entities related to the first entity and the second entity,
  - wherein the derived entities are marketing segments related to the first entity and the second entity,
  - wherein the marketing segment includes developing a marketing campaign from a marketing campaign algorithm;
- triggering, by the computer-based system, an updating of the entity graph;
- detecting, by the computer-based system, a change to the entity graph based on a trend,
  - wherein the trend includes periodic updates to a series of entity graphs over time based on changes in different versions of data within a graph database obtained from version timestamps;
- alerting, by the computer-based system, an application to take an action to adjust for the trend;
- tailoring, by the computer-based system, the two nodes based on the trend;
- recommending, by the computer-based system, the two nodes to other entities; and
- reducing, by the computer-based system, the distance between the two nodes, in response to the strengthening of the relationship between the first entity and the second entity.

9. The article of claim 8, further comprising tailoring, by the computer-based system, marketing to the first entity based upon the entity graph.

10. The article of claim 9, further comprising detecting, by the computer-based system, fraud against the first entity based upon the entity graph.

11. The article of claim 10, further comprising:
- generating, by the computer based system, a second entity graph between a third entity and a fourth entity; and
- combining, by the computer-based system, the second entity graph with the entity graph to create a universal entity graph.

12. The article of claim 11, further comprising adjusting, by the computer-based system, the edge based upon a change in the relationship between the first entity and the second entity.

13. A system comprising:
- a relationship engine that determines a relationship between a first entity and a second entity based upon internal data and online data associated with the first entity and the second entity; and
- a graphing pipeline coupled to an application that generates an entity graph comprising at least two nodes and an edge connecting the at least two nodes, based upon the relationship and based on attributes associated with the edge,
  - wherein the two nodes correspond to the first entity and the second entity, respectively,
  - wherein the two nodes include at least one of merchants, interests, brands or spend,
  - wherein the edge corresponds to the relationship between the first entity and the second entity, and
  - wherein the attributes include at least one of a distance, a number of entities connected to a node, a type of the edge, a group of entities coupled to the edge, a group of entities coupled to another entity, a group of entities coupled to a group of entities, or a network analysis result based upon entity relationships,
- the graphing pipeline further calculates attribute values associated with the edge;
- the graphing pipeline reduces the distance between the two nodes, in response to the strengthening of the relationship between the first entity and the second entity;
- a graph event trigger module that triggers an updating of the entity graph;
- the graph event trigger module detects a change to the entity graph based on a trend;
- the graph event trigger module alerts an application module to take an action to adjust for the trend,
  - wherein the trend includes periodic updates to a series of entity graphs over time based on changes in different versions of data within a graph database obtained from version timestamps;
- the graph event trigger module derives, based on the attribute values, derived entities related to the first entity and the second entity,
  - wherein the derived entities are marketing segments related to the first entity and the second entity,
  - wherein the marketing segment includes developing a marketing campaign from a marketing campaign algorithm;
- the graph event trigger module tailors the two nodes based on the trend; and
- the graph event trigger module recommends the two nodes to other entities.

14. The system of claim 13, wherein the graph event trigger module causes marketing to be tailored to the first entity based upon the entity graph.

15. The system of claim 14, further comprising a graph database that is used to detect fraud against the first entity based upon the entity graph.

16. The system of claim 15, wherein the graphing pipeline periodically updates the entity graph based upon new internal data, new external data, and new online data.

17. The system of claim 16, wherein the graphing pipeline generates a second entity graph between a third entity and a fourth entity, combines the second entity graph with the entity graph to create a universal entity graph.

18. The system of claim 17, wherein the graphing pipeline further generates the entity graph based upon data received from at least two of: a merchant graph pipeline, an interest graph pipeline, a brand graph pipeline, and a spend graph pipeline.

* * * * *